Figure 1:
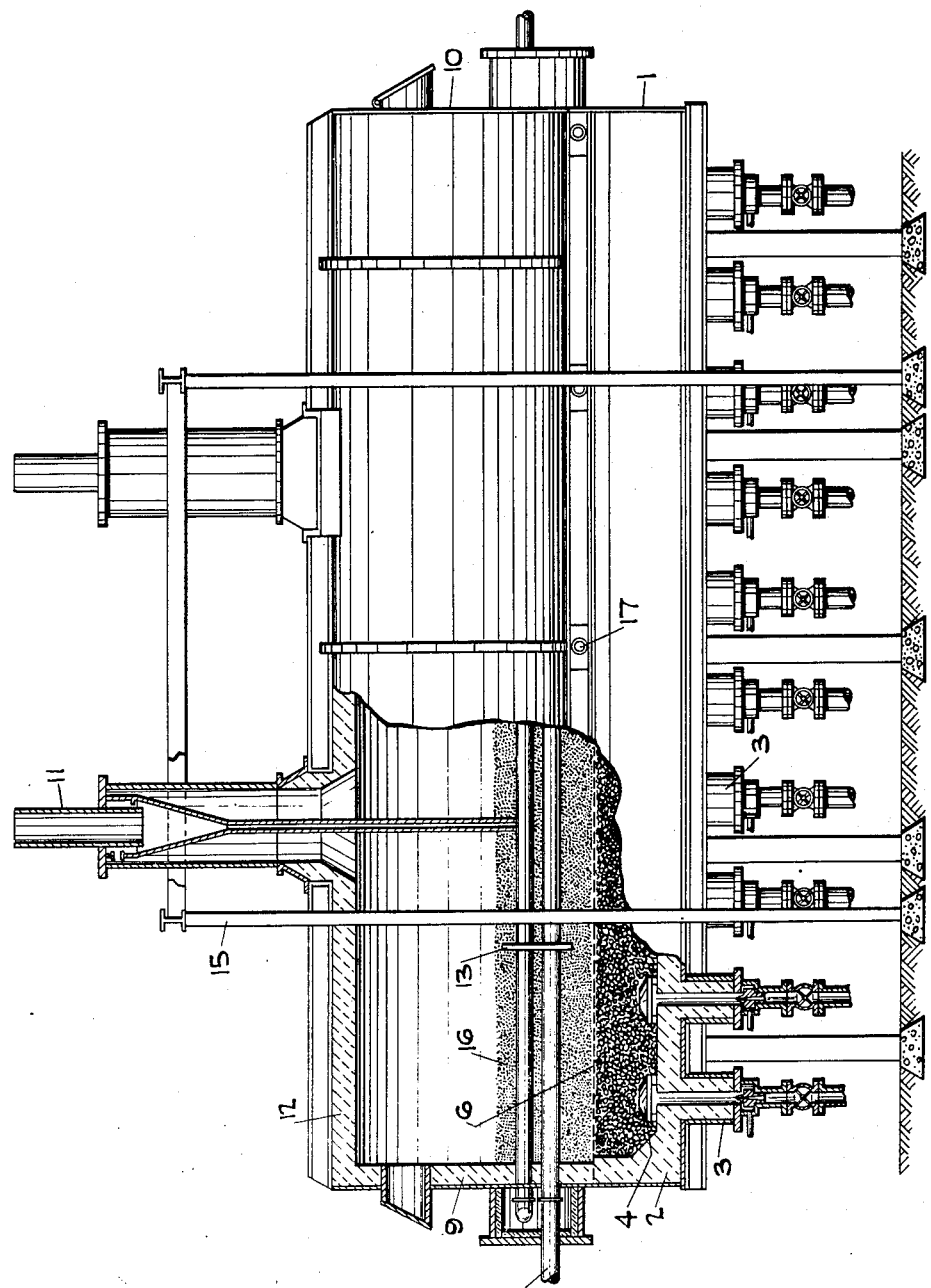
Figure 2:
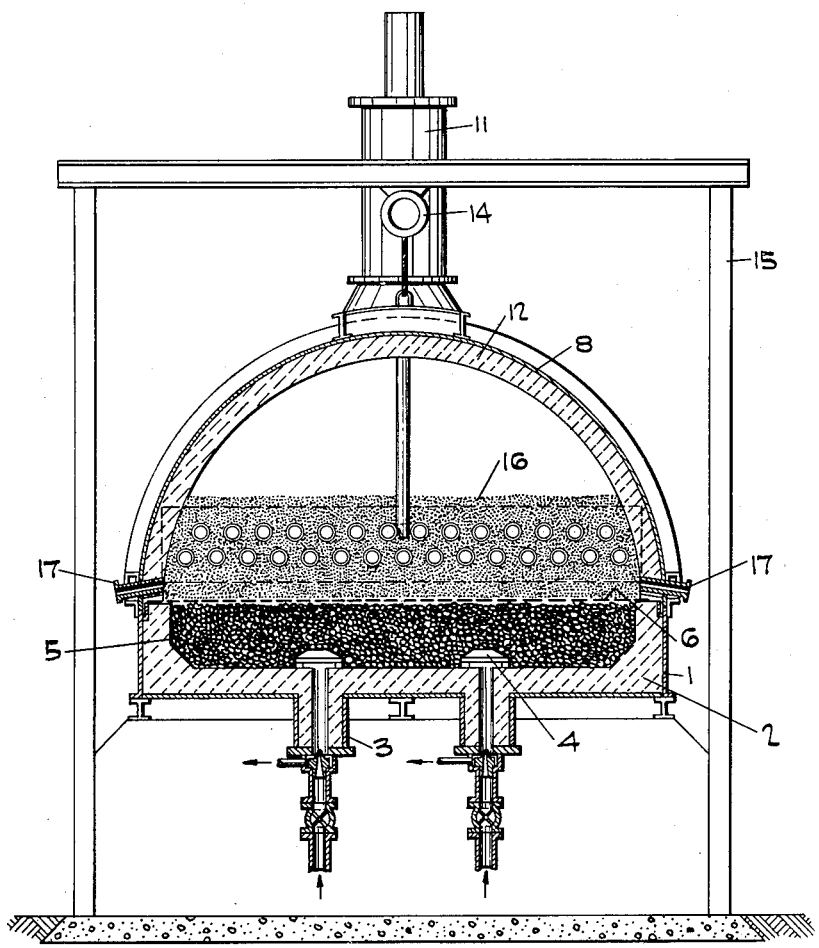

Sept. 16, 1952  P. J. SCHOENMAKERS ET AL  2,610,842
APPARATUS FOR THE INDIRECT HEATING OF FLUIDS Filed June 13, 1951  2 SHEETS—SHEET 2

Inventors:
Pieter Jan Schoenmakers
Willem Lodewijk van de Putte
By
their Attorney Patented Sept. 16, 1952

2,610,842

UNITED STATES PATENT OFFICE 2,610,842

APPARATUS FOR THE INDIRECT HEATING OF FLUIDS

Pieter Jan Schoenmakers and Willem Lodewijk van de Putte, Delft, Netherlands, assignors to Shell Development Company, Emeryville, Calif., a corporation of Delaware Application June 13, 1951, Serial No. 231,284
In the Netherlands June 15, 1950

1 Claim. (Cl. 263—42)

This invention relates to apparatus for the indirect heating of fluids by combustion of suitable fuels.

In many processes it is desired to heat a fluid material to a desired temperature while at the same time carefully avoiding any overheating. Various heaters, boilers, and furnaces of relatively complicated design have been suggested for such use. While such special apparatuses are superior to conventional furnaces for this type of operation, they are generally either very costly to build, operate, and maintain, or they are wasteful of heat energy. In furnaces of conventional design high heat transfer rates are obtained in the radiant section, and low heat transfer rates are obtained in the convection section. If the furnace is designed to obtain good heat economy, the desired uniformity of heating is lost. On the other hand, if the apparatus is designed for even and uniform heating, the heat economy is poor.

One solution to the problem lies in the application of indirect heat transfer through a fluidized powder. By this means, very uniform heating may be obtained with excellent heat transfer rates. Unfortunately, however, the application of fluidized powders for such heaters is generally quite costly and involves certain difficult engineering problems. One of these problems, by way of example, is the problem of distributing the hot combustion gases in the mass of fluidized powder. Grids, distribution lines, and such arrangements are generally not satisfactory; ceramic materials do not have the required strength and metal grids do not withstand the high temperatures caused by impingement of hot combustion gases direct from the burner. In one furnace of this general type recently patented (U. S. 2,493,498) this difficulty is overcome by direct combustion of the fuel within the bed of powder itself. This avoids this specific difficulty but, on the other hand, has the disadvantage that the combustion efficiency is low when the apparatus is operated in the moderate temperature range usually desired.

The apparatus of the present invention makes use of the high heat transfer rates and exceptionally uniform temperatures afforded by a fluidized bed of a finely divided solid as a heat transfer medium. Thus, the tubes carrying the fluid to be heated are bathed in a fluidized bed of powder.

An object of the invention is to provide an improved apparatus which allows excellent combustion efficiency even when operating the apparatus at low temperatures and which avoid many of the engineering difficulties and shortcomings of hitherto-known apparatus designed for this purpose. It is also an object of the invention to provide an apparatus which can be built and operated at a low cost.

In most previous applications of a fluidized bed of powder as a heat transfer medium it has been considered necessary to provide a fluidized bed having the highest practicable ratio of height to horizontal cross-section. Thus, it has been the practice to provide a fluidized bed having a height at least equal to, and preferably several times as large as, the shortest diameter. For example, a fluidized bed in a cylindrical vessel 3 meters in diameter would have a minimum depth of 3 meters. This consideration has, in general, led to the use of vertically disposed vessels, usually upright cylindrical vessels. One feature of the apparatus of this invention is that a very shallow fluidized bed is used. Thus, the bed is not more than about 75 cm. deep and the ratio of the depth of the bed to its cross-section (measurements in decimeters) is preferably below about 0.01.

When using beds of high ratio of depth to horizontal cross-section, it is found that a general overall circulation pattern is set up with the powder generally rising in one section and descending in another. This has generally been considered desirable. It is now found, however, that equal or better heat transfer and uniformity of temperature can be maintained in beds of very low ratio of depth to horizontal cross-section, since in such beds the large overall circulation pattern is broken up into a large number of short eddy currents. To attain this condition, it is, however, essential that the apparatus be specially designed.

In the usual type of apparatus where the ratio of bed depth to horizontal cross-section is high a problem is encountered in distributing the hot combustion gases over the cross-section of the bed. In general the smaller the cross-section of the fluidized bed, the less acute this problem becomes, and this is one of the reasons for the previous preference for tall beds of small cross-section. From the operational standpoint, suitable solutions have been suggested, but from a practical and economic standpoint, the previous solutions leave much to be desired. The usual solution is to distribute the hot combustion products over the cross-section of the fluidized bed by means of a conical section terminating in a gas distributing grid. A feature of the apparatus of the invention is that the combustion of the fuel is carried out in a plurality of small depending combustion chambers and that the hot combustion products are distributed without the use of a grid or of a distributor pipe.

To obtain a good distribution of gases with a tall bed, very considerable pressure drops are required; these require costly structures and furthermore require excessive costs for compressing the air for combustion. Since in the apparatus of the invention a very shallow bed of fluidized powder is used, the pressure drop is small. Consequently, the power consumption is small.

A further feature of the apparatus of the invention is that highly efficient high turbulence burners (which may for instance even burn asphalt) may be used and are located at the shortest possible distance from the zone of heat transfer.

Still another feature of the apparatus of the invention is that it may readily be designed to allow quick and easy access to the parts for maintenance.

The above and other features of the apparatus will be described in connection with the accompanying drawings wherein one suitable design of the apparatus is illustrated semi-diagrammatically.

Figure I shows a vertical view of the apparatus, partly in section; Figure II is a profile section of the apparatus of Figure I.

Referring to the drawings, the apparatus comprises a rectangular, flat bed member 1 which in the case illustrated is a shallow, open topped steel box lined in the interior with a suitable refractory lining 2. In a typical case the bed member is 10 meters long by 2 meters wide and has an internal depth of 35 centimeters. This bed member may be mounted on short piers as illustrated.

The apparatus is provided with a number of combustion chambers 3 which are evenly distributed over the cross-section in such a manner that there is at least one combustion chamber for each 4 square meters of horizontal area. In the apparatus illustrated there are two parallel rows of combustion zones providing one combustion zone for approximately each square meter of horizontal cross-section.

Each combustion chamber comprises a depending cylindrical chamber lined with a suitable refractory material and provided at the bottom with a suitable burner. Any type of burner affording substantially complete combustion of the fuel in the limited space may be used. A particularly suitable type of burner is the so-called Delft Annular Slit Burner, such as described in Netherlands patent application, Serial No. 157,965, or British patent application, Serial Number 28,422/50. An atomizer for the liquid or pulverized fuel is fitted in the center with means for producing air rotation. At the periphery a second air supply opening in the form of an annular slit debouches into the chamber. The rotating air supplied at the periphery moves substantially helically along the chamber wall during which it is consumed in the combustion process. Unburned fuel near the center of the chamber is thrown toward the chamber wall by centrifugal force and is burned in transit. The rotation of the air flowing along the chamber wall results in stabilization of the flame around the chamber axis. Burners of the type indicated provide a very high heat release in a small combustion space and the issuing gases are substantially free of unburnt fuel or excess air.

The upper ends of the cylindrical depending combustion zones are capped by dome-shaped deflectors 4 which deflect the flow of combustion gases from vertical to horizontal. The hot combustion gases, therefore, enter the flat bed member at a plurality of points just above the bottom refractory lining and are caused to enter in a radiating horizontal direction.

The flat bed member is filled with a fixed bed 5 of granular refractory material which serves as a first heat transfer medium. The particles are sufficiently large that they are not fluidized by the incoming hot combustion gases. This also insures a low pressure drop. On the other hand, the particles should not be too large. If the particles are too large, the gas velocity in the interstices is low and, consequently, the overlying bed of more finely divided material tends to fill the interstices. This leads to partial plugging, high pressure drop, and channelling of the combustion gases. The optimum size, it is found, is that at which the particles are at incipient fluidization at the normal combustion rate. Incipient fluidization is that point at which the bed begins to swell upon increase of the gas velocity. The optimum size of the particles will depend somewhat upon the shape and density of the particles and will usually be between 2 mm. and 10 mm. The particles making up the bed 5 may be angular or rounded and may consist of any refractory material capable of withstanding the action of the hot combustion gases. Broken fire brick, magnesite, silica, gravel and the like may be used.

In the operation of the apparatus, the hot combustion gases entering in a horizontal direction at the bottom of the bed 5 transfer heat to the fixed bed of granules which in turn transfer heat to the overlying fluidized bed. The large flat mass of bed 5 is, consequently, quite hot near the bottom and cooler near the top. This large mass with its large upper surface facilitates the transfer of large amounts of heat by both radiation and conduction. In order to improve the transfer, the bed may be advantageously composed of a lower layer of highly refractory material such as magnesite and an upper layer of metal balls which have superior heat conducting properties and also, in view of their greater density, allow higher gas velocities to be applied without causing fluidization.

As stated, the particles in bed 5 are such that at the normal combustion rate the bed approaches fluidization. Under these conditions, there is a tendency for individual particles to be drawn up into and floated in the upper fluidized bed with the gradual formation of a poorly segregated mixture of large and small particles. In order to avoid this condition, the apparatus is provided with a screen 6 which is placed on top of the bed 5 and serves to prevent the relatively large particles composing bed 5 from floating up into the overlying fluidized bed. Since the screen 6 serves only to prevent floating of these particles, the perforations are preferably as large as possible consistent with the purpose. Thus, the screen is relatively open and is subjected to no appreciable forces. It may, consequently, be of light, inexpensive construction such as a woven wire screen, a thin perforated plate, expanded sheet metal such as used as a backing for plaster, or the like.

The tubes 7 to be heated are mounted lengthwise and essentially horizontally in the top section of the apparatus which is in the form of a horizontal half cylinder 8 provided with suitable end closures 9 and 10. The top or bell section containing the tubes 7 is arranged to rest upon the top of the lower bed section forming an effective seal. Since there is no appreciable pressure involved, any simple sealing arrangement such as a flange or tongue resting in a small channel is sufficient.

The whole top section, including the exhaust tubes 11 with cyclones, may be raised by means of any suitable hoist thereby exposing the entire interior for maintenance of the interior refractory lining 12, the tubes 7, the tube hangers 13, the screen 6 and the lower bed 5. In the apparatus illustrated the top section is raised and lowered by means of hoists 14 supported by the steel structure 15.

In normal operation a bed of fluidized solid refractory material 16 is maintained in the upper section above the screen 5. This bed, like the lower bed is very shallow and should not be appreciably higher than necessary to cover the tubes 7. In general, the bed 16 should not exceed about 75 cm. in depth and may be of the order of 25-50 cm., regardless of the size of the apparatus. In the typical case illustrated, this bed is 55 cm. deep (measured in unfluidized state). The particles composing the fluidized bed are many times smaller than those composing the lower fixed bed, e. g., $\frac{1}{10}$ the size. In some cases, depending upon the material, particles up to about 1 mm. will be used, but in most cases somewhat smaller particles are preferred. Particles having an average diameter of about 180 microns are quite suitable. Very fine powders, e. g., having an average particle size below about 40 microns, are not recommended as they prevent the use of high gas velocities. The powder composing the fluidized bed may be composed of any solid material capable of withstanding the temperatures normally encountered without burning, fusing or decomposing. By way of example, fine river sand, powdered metals, spent cracking catalysts, and the like are suitable.

In order to facilitate charging and withdrawing the powder, the apparatus is provided with ports 17 in the upper section at about the level of the screen 6.

In the apparatus described, the transfer of the heat from the fuel to the tubes is effected very efficiently at a minimum cost. Thus, instead of the heat being generated inefficiently in the fluidized bed, substantially perfect combustion is effected in small separate combustion zones. The hot combustion gases, entering horizontally, impart a large part of their heat to the lower fixed bed of refractory which, in turn, is arranged to expose a large radiating and conducting surface to the overlying fluidized bed. The upper or fluidized bed is very shallow, thus providing a very low pressure drop and allowing efficient heat transfer from the lower refractory bed. The radial introduction of the hot combustion gases in the lower fixed bed, coupled with the shallow fluidized bed, provide just sufficient dirtribution of the cooled combustion gases into the upper bed to insure the formation of shallow eddy currents which increase the adsorption of heat and its subsequent release to the tubes.

We claim as our invention:

An apparatus for the even controlled and continuous indirect heating of a fluid which comprises in combination a lower refractory lined bed member containing a long horizontal shallow fixed bed of refractory granules and provided at the bottom with a plurality of separate combustion zones with burners, at least one of said combustion zones being provided for each 4 square meters of horizontal cross-section, a deflection cap at the end of each of said combustion zones just above the bottom of said bed and arranged to deflect the hot combustion gases in a horizontal and radial direction in said bed, a relatively open hold-down screen resting upon said bed, an upper refractory lined cover section arranged to rest upon said lower section and form a seal therewith, said cover section being provided with: (a) upper discharge vents with cyclone dust separators (b) horizontal tubes to be heated (c) tube support brackets, and (d) outlets above and adjacent said seal, and a shallow bed of fluidized finely divided refractory powder supported upon said fixed bed and screen and covering said tubes to be heated.

PIETER JAN SCHOENMAKERS.
WILLEM LODEWIJK VAN DE PUTTE.

REFERENCES CITED

The following references are of record in the file of this patent:

UNITED STATES PATENTS

| Number | Name | Date |
|---|---|---|
| 737,279 | Ruby | Aug. 25, 1903 |
| 2,493,498 | Perry | Jan. 3, 1950 |